United States Patent Office 3,135,138
Patented June 2, 1964

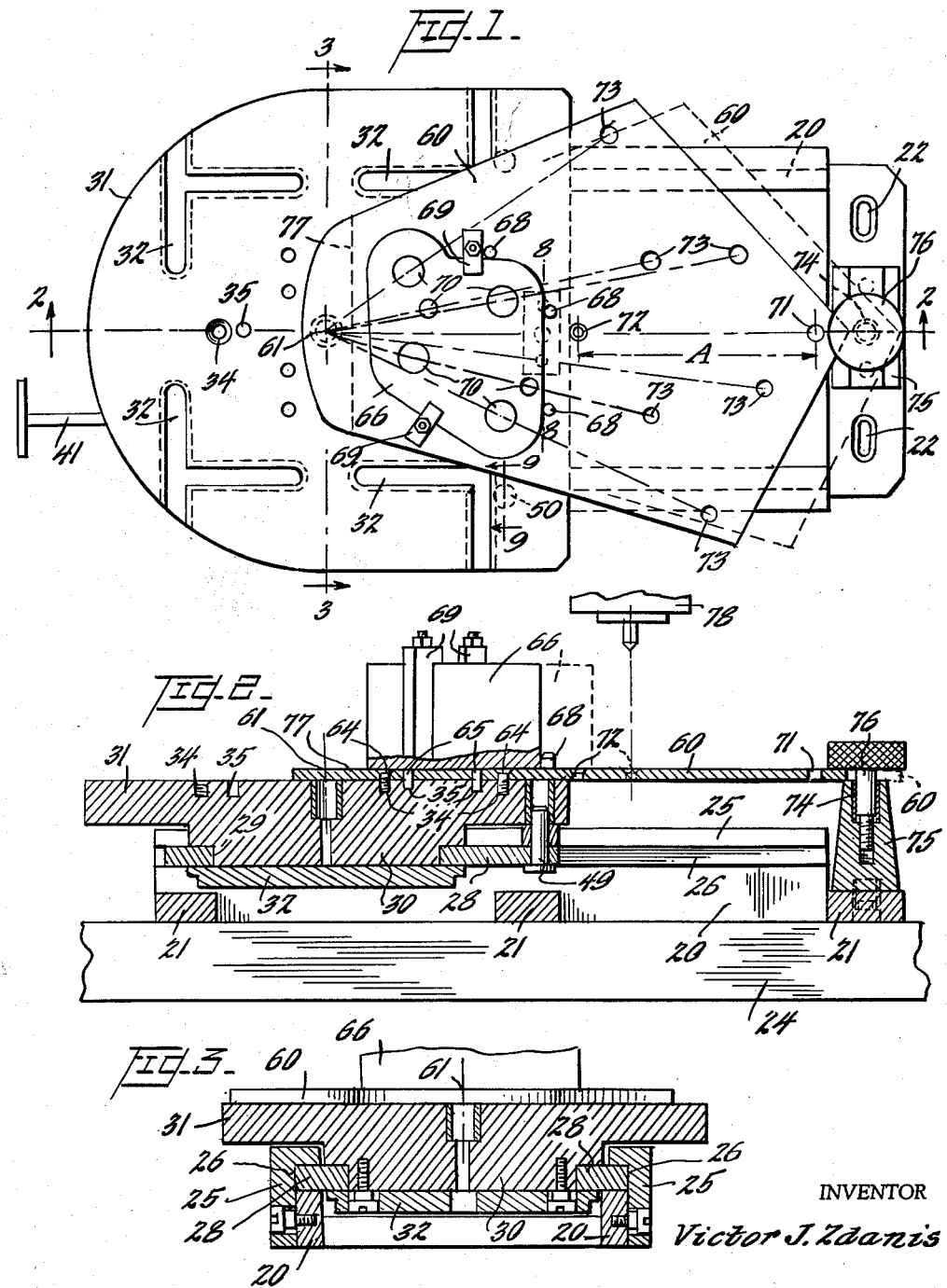

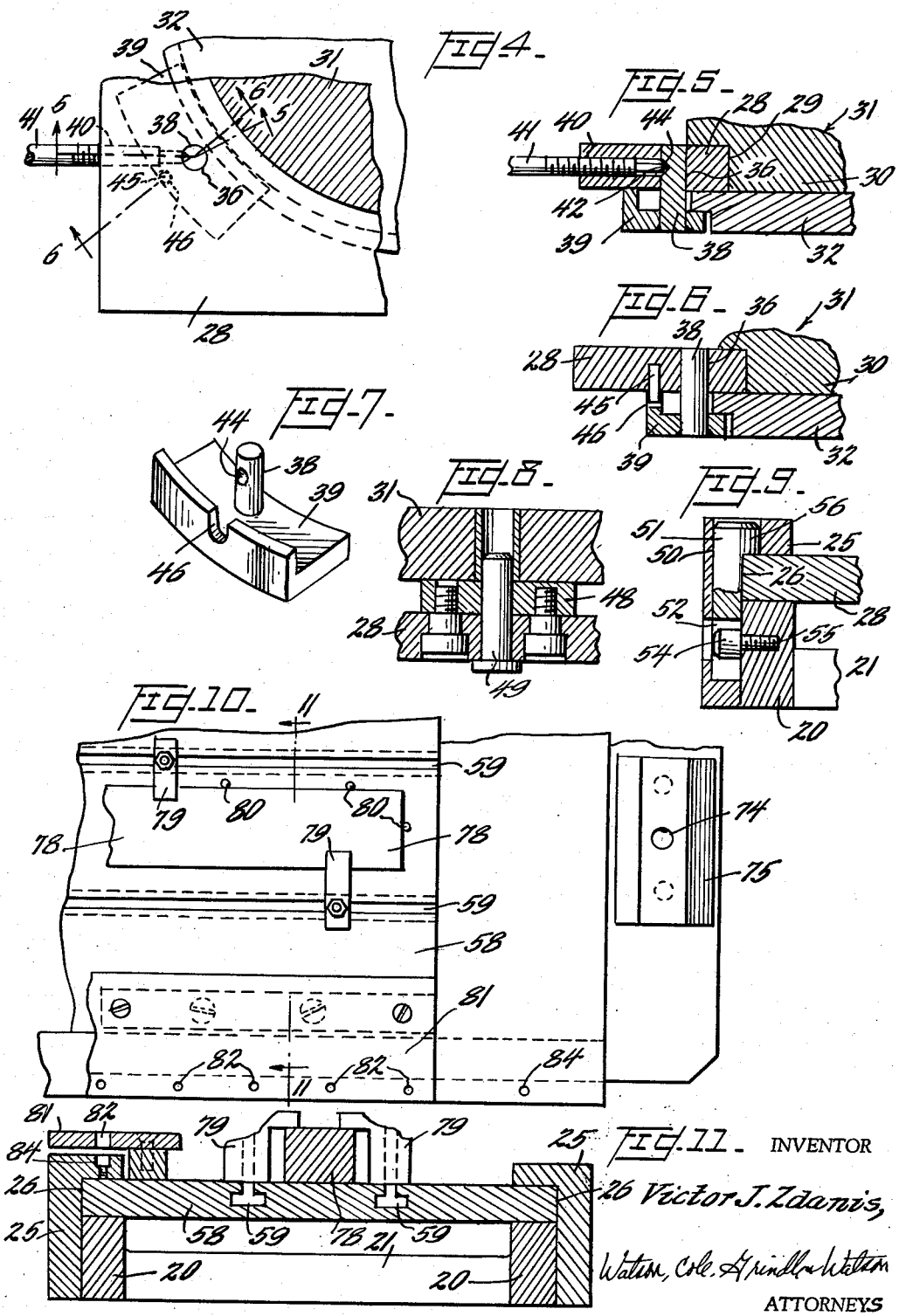

3,135,138
POSITIONING TABLES
Victor J. Zdanis, 116 Granada St.,
New Smyrna Beach, Fla.
Filed Dec. 8, 1960, Ser. No. 74,554
4 Claims. (Cl. 77—64)

This invention relates to positioning tables and more particularly to template controlled tables for positioning a work piece relative to the spindle of a machine tool.

In manufacturing a workpiece containing numerous holes of various sizes, it is customary to make such a part on a jig bore or similar machine. The work piece is clamped to the bed of the jig bore or other machine and the axes of the various holes to be bored are sequentially aligned with the axis of the spindle, mounting the boring tool, by means of the positioning mechanisms provided for the table of the machine. The positioning mechanism for the table of a machine tool usually takes the form of a pair of lead screws for shifting the table in each of two mutually perpendicular directions within the plane of the table. It is readily apparent that such a procedure is time consuming due to the necessity for making two rectilinear adjustments in order to successively position the axes of each of the holes to be bored in alignment with the spindle of the machine. Also, when a plurality of identical parts is to be made, the time involved, in terms of labor cost, is prohibitive.

It has been proposed in the past to provide positioning tables or work holders utilizing apertured templates which are engaged by a fixed pin to position the table or work holder in a plurality of positions relative to the spindle of a machine tool. In these prior art devices, the positioning pin is customarily axially aligned with the spindle of the machine tool. Thus, when the table or work holder is moved into approximate alignment with the machine spindle, the positioning pin and template were both hidden from the view of the operator. Consequently, the operator could only approximately position the work piece visually. To rectify this situation, the positioning pins are provided with a taper and a mechanism for driving them into the apertures in the templates in order to effect final positioning of the work piece. When the work piece being made is massive, the combined inertia of the work piece and holder make it difficult for the operator to effect the initial positioning and for the positioning pin to effect the final positioning. Manifestly, it would be desirable if a positioning table could be provided which obviates the aforementioned difficulties.

It is, therefore, a primary object of this invention to provide a new and improved positioning table.

It is another object of this invention to provide a template controlled positioning table for machine tools wherein the template is in view of the operator to facilitate rapid adjustment of the table.

It is a further object of this invention to provide a template controlled positioning table capable of universal movement to eliminate the need for coordinate shifting of work pieces.

It is yet another object of this invention to provide a universally movable positioning table which eliminates the possibility of positioning errors due to backlash which are inherent in lead screw positioning mechanisms.

With these and other objects in view, the present invention contemplates a positioning table comprising a base and a table mounted for universal movement in a plane parallel to the base. Means are provided for fastening a template to the surface of the table and for securing a work piece to the surface of the template and in predetermined relationship therewith. The base is provided with a pin and socket arrangement for engagement with preformed apertures in the template to permit successive positioning of the work piece in a plurality of positions relative to the base. By initially positioning the device in predetermined relationship the spindle of the machine tool, successive positioning of the work piece relative to the base of the device will inherently result in positioning of the work piece relative to the machine spindle.

An alternative embodiment of the present invention contemplates a device wherein the table is mounted for reciprocatory rather than universal movement. This embodiment of the invention would have utility in positioning long, narrow work pieces in which all the holes to be bored have a common, transverse axis.

Other objects, advantages and novel features of the invention will become readily apparent upon consideration of the following detailed description when taken in conjunction with the accompanying drawings wherein:

FIGURE 1 is a top plan view illustrating an apparatus embodying the principal features of the invention;

FIGURE 2 is a full section taken along the line 2—2 of FIGURE 1 and illustrates to advantage the manner in which a template and work piece may be secured to the table;

FIGURE 3 is a full section taken along the line 3—3 of FIGURE 1 and illustrates the mechanism which permits universal movement of the table;

FIGURE 4 is a fragmentary plan view of a clamping device for holding the table against rotary movement;

FIGURE 5 is a sectional view taken along the line 5—5 of FIGURE 4 and illustrates details of the clamping device;

FIGURE 6 is a sectional view taken along the line 6—6 of FIGURE 4 and illustrates further details of the clamping device;

FIGURE 7 is a perspective view of the clamping element of FIGURE 4;

FIGURE 8 is a sectional view taken along the line 8—8 of FIGURE 1 and illustrates a pin arrangement for locking the table with the longitudinal axis thereof coinciding with the longitudinal axis of the base;

FIGURE 9 is a sectional view taken along the line 9—9 of FIGURE 1 and illustrates a clamping device utilized to hold the table and slide mechanism against reciprocatory movement parallel to the base;

FIGURE 10 is a fragmentary plan view of an alternative embodiment of the invention wherein the table is mounted for reciprocatory rather than universal movement; and FIGURE 11 is a sectional view taken along the line 11—11 of FIGURE 10 and illustrates the relative positions of template and work piece when mounted on the table.

Attention now is directed to the drawings wherein like numerals of reference designate like parts throughout the several views and in particular to FIGURES 1 to 3 wherein is disclosed an apparatus embodying the principal features of the invention. The apparatus comprises a base formed of longitudinal members 20 and transverse members 21. The transverse members 21 are provided with counter-bored slots 22 to facilitate the attachment of the base to a table 24 of a jig bore or other machine tool. A pair of side rails 25, of L-shape in cross-section, are secured to the exterior sides of the longitudinal members 20 and cooperate therewith to define slideways 26.

A slide 28 is mounted on the base with the lateral edges thereof projecting into the slideways 26. The slide 28 is provided with a large circular aperture 29 which is adapted to receive a projecting portion 30 formed on a rotary table 31. A cap 32, of a diameter greater than the aperture 29, is secured to the underside of the table 31 to retain the projecting portion 30 within the aperture 29. Manifestly, a combination of reciprocatory movement of the slide 28 within the slideways 26 and rotary movement of the table 31 within the apertures 29 permits universal movement of any object fixed on the surface of the table.

The surface of the table 31 is provided with a plurality of slots 32 of T-shape in cross-section. These slots are adapted to accommodate various clamping devices. The table surface is also provided with tapped holes 34 and matching smooth bored holes 35. The holes 34 and 35 are provided to receive machine screws and dowel pins for the purpose of securing templates to the surface of the table 31 and in predetermined relationship therewith.

The slide 28 is provided with an aperture 36 (FIGURES 4 to 7) which is adapted to receive a cylindrical pin portion 38 of a clamping element 39. The slide 38 is further provided with a threaded aperture 40 which intersects the aperture 36 at right angles. A table clamp actuator 41 is threaded within the aperture 40. The actuator 41 is provided with a conical tip 42 (FIGURE 5) which is received within a conical aperture 44 in the pin portion 38 of the clamping element 39. The conical aperture 44 is of greater base diameter than the tip 42 of the actuator 41 so that gravity normally holds the clamping members in the position best shown in FIGURE 5. As the actuator 41 is threaded into the aperture 40 it will be obvious that the camming action between the tip 42 and aperture 44 will tend to elevate the pin portion 38 and hence the clamping element 39. This elevation of the clamping element 39 will force the cap 32 against the slide 28 to preclude rotation of the table projection 30 within the aperture 29. A pin 45 is fixed in the under surface of the slide 28 and projects into a notch 46 formed in the clamping element 39 to prevent rotation of the element 39 and thus maintain the conical aperture 44 aligned with threaded aperture 40.

The slide 28 has secured to one end thereof a wear block 48 (FIGURE 8). The height of the block is such that the top surface thereof slidably engages the under surface of the table 31. This engagement of the block 38 with the table 31 serves to provide additional support for the table 31 during machining operations. A locking pin 49 is provided for insertion into apertures formed in the slide 28, the wear block 48 and the table 31. When the pin 49 is inserted in the position shown in FIGURE 8, the table 31 will be locked in the position shown in FIGURE 1. This arrangement permits the table to be locked against rotation for various setting up operations.

Each side rail 25 is provided with an aperture 50 (FIGURE 9) within which are slidably positioned slide clamps 51. The clamps 51 are each provided with a recess 52 which receives an excentrically mounted head 54 of a clamping screw 55. When rotated to the position shown in FIGURE 9, the head 54 bears against the bottom surface of the recess 52 and urges the clamp 51 downwardly. Downward movement of the clamp 51 causes an overhanging portion 56 thereof to urge the slide 28 firmly against the tops of the longitudinal members 20 to preclude movement of the slide along the slideways 26.

FIGURES 10 and 11 illustrate an alternative embodiment of the invention. In this embodiment the slide 28 and the table 31 are replaced by a slide 58. Since the table 31 is omitted, a work piece can only be reciprocated rather than universally moved. This embodiment is intended for use with long narrow work pieces in which all of the holes to be bored have a common transverse axis. The slide 58 is provided with slots 59, of T-shape in cross-section, for the purpose of accommodating various types of clamps to retain work pieces on the surface of the slide.

*Operation*

In order that a better understanding of the invention may be had, its mode of operation will now be described. A template 60 is first prepared as follows. A sheet of metal is fastened to the table of a jig boring machine and a point 61 is first marked on the sheet to represent the center of the table 31. Measuring from the point 61, clearance holes are then bored in the template with the spacing thereof corresponding to the distances of the threaded holes 34 and smooth bore holes 35 from the axis of the table (right hand side in FIGURE 2).

These holes serve to accommodate hold down screws 64 and dowel pins 65 which precisely position the template in relationship to the axis of the rotation table 31. A location for a work piece 66 on the template 60 is then arbitrarily selected and additional holes are bored in the template to accommodate locating pins 68. The pins 68 serve to permit successive work pieces to be mounted on the template 60 in identical positions. Further holes are bored and tapped in the template 60 to accommodate clamps 69 which serve to hold the work piece 66 firmly against the template 60 and against the locking pins 68. Alternatively, the clamps 69 may be mounted in the slots 32 rather than directly on top of the template 60.

Using the coordinate mechanism of the jig bore, the template 60 is then shifted in accordance with the dimensions of the part to be made and construction holes, are bored in the template with the axes thereof coincident with the locations of the axes of holes 70 which are to be bored in the work piece 66. It is not necessary that the diameter of these construction holes be the same as the desired diameter of the holes of the finished work piece. It is merely necessary that, when a work piece 66 is positioned against the locating pins 68, the axes of the construction holes and the desired holes in the work piece will coincide.

At the extremity of the template 60 opposite the point 61, a first locating aperture 71 is bored in the template. A second locating aperture 72 is then bored in the template on a line extending between the point 61 and the center of the aperture 71 and spaced an arbitrary distance A from the aperture 71. The distance A is designated as the tooling dimension. A plurality of positioning indicia such as the holes or apertures 73 are then bored in the template 60. Each of these apertures 73 corresponds to one of the holes 70 to be bored in the work pieces 66, and each of these apertures 73 is positioned on a radius extending from the point 61 through the center of the corresponding construction hole at a distance from the corresponding hole equal to tooling dimension A.

The specific shape asssumed by the template 60 is not in any way critical. It is merely necessary that the configuration be such as will accommodate the locating apertures 71 and 72 and the positioning apertures 73 in such positions that the table 31 is free to rotate without interference between the corners thereof and the locating block 75. Manifestly, the particular shape of the template is governed by the shape of the particular work piece and the operations to be performed thereon. It will be apparent that the illustrated configuration of the template 60 accomplishes these purposes for the specific work piece shown. If desired, the completed template may be cut along the line 77 to permit access to the central bore of the table 31 when the template is secured thereto.

The base of the apparatus is then secured to the table 24 by means of screws (not shown) positioned within the slots 22. It is desirable, although not essential, that the longitudinal axis of the apparatus be parallel to the longitudinal axis of the table 24. The template 60 is then secured to the table 31 by means of the hold down screws 64 and dowel pins 65. The work piece 66 is then placed on the template 60 in abutting relationship with the locating pins 68 and clamped in this position by means of the clamps 69.

The table and slide assembly is then moved to the right (as viewed in FIGURES 1 and 2) until the locating aperture 71 coincides with an aperture 74 formed in a locating block 75 which is mounted on the right hand transverse member 21. This is the position of the template 60 as shown in phantom lines in FIGURES 1 and 2. A locating pin 76 is then inserted into the aligned apertures 71 and 74 to hold the template, and hence the table 31, in a fixed position relative to the base. At this time the pin 49 is removed to free the table for rotation. The table 24 is then shifted until the second locating aperture 72 is axially aligned with the spindle 78 of the machine. This may be accomplished by use of the shifting mechanism for the table 24 and a dial indicator (not shown) fastened to the spindle 78 in the customary manner well known to those skilled in the art. The device is then ready for machining operations.

To machine the work piece 66 shown in FIGURES 1 and 2, the pin 76 is removed and the template and work piece are shifted, through a combined sliding of the slide 28 and rotation of the table 31, to bring one of the positioning apertures 73 into register with the aperture 74 in the member 75. The pin 76 is then reinserted to lock the template and work piece in this position. Since the aperture 73 is spaced from the point at which the hole is to be bored in the work piece 66 a distance equal to tooling dimension A, the axis of the desired hole 70 will now be coincident with the axis of the spindle 78.

The clamp actuator 41 and clamping screws 55 are then rotated to tighten their associated clamps and thus lock the table 31 against rotation and the slide 28 against reciprocation.

The spindle 78 can then be started and the desired size hole 70 can be bored in the work piece using an appropriately sized tool. Upon completion of this boring operation the pin 76 is removed and another of the positioning apertures 73 brought into register with the aperture 74. The next boring operation is then performed again using an appropriately sized tool. When the work piece is completed, a new work piece is clamped into position and the aforementioned sequence of operations may be repeated.

When using the embodiment of the invention illustrated in FIGURES 10 and 11, a work piece 78 is located on the slide 58 by means of clamps 79 and locking pins 80 which are set into the upper surface of the slide 58. A template 81 is secured to the surface of the slide 58 and provided with a plurality of positioning apertures 82, the spacing between which corresponds to the desired spacing of the holes to be bored in the work piece 78. The side rail 25 adjacent the template 81 is provided with an aperture 84 which is appropriately positioned directly beneath the apertures 82 in the template 80. The locating pin 76 may again be used in conjunction with the apertures 82 and 84 to lock the slide 58 in each of the desired positions and the boring operations performed as before described.

It will be readily apparent that the aforedescribed invention incorporates many advantages not found in the prior art. The device is of a simplified construction which is easy to both manufacture and maintain. The present invention provides positive control of the position of the work piece at all times. By use of the apparatus of the present invention to produce a plurality of parts, it is possible to make a semi-production machine out of a jig bore. The universal movement of the template, work piece and table permits the change of both coordinates at the same time. By eliminating lead screws this invention precludes the possibility of human error due to a failure to compensate for the backlash which is inherent in all threaded devices. Since the template is mounted in sight of the operator, it is possible to print or stamp a legend adjacent the various positioning holes to describe the particular tools to be used or operations to be performed at that position on the work piece and thus eliminate the possibility of human error in these respects. Although the present invention has been described in conjunction with the operation of a jig bore or other type of machine tool utilizing a vertically disposed spindle, it will be readily apparent that it can be used with equal facility in any machine having inclined or horizontally disposed spindles as well.

It is to be understood that the above described embodiments are simply illustrative of the principal features of the invention. Numerous modifications may be readily devised by those skilled in the art which embody the essence of the present invention and fall within the spirit and scope thereof.

What is claimed is:

1. In a machine tool of the class including a base and a spindle mounted for rotation about an axis fixed with respect to said base, the combination comprising a slide guided on said base for rectilinear movement transversely to said spindle axis, a table mounted on said slide for rotary movement about an axis parallel to that of the spindle axis, said axes being relatively aligned in the direction of said rectilinear movement, a template fixed on said table for rotary movement therewith and projecting radially from said table axis substantially across said spindle axis, means for successively securing each of a plurality of identical workpieces in the same predetermined position on said template, said template being formed with a plurality of locating holes radially outwardly of the position of the workpiece with respect to said table axis, each said hole being radially aligned with, and all being equally spaced from, the respective points on said workpiece which are to be aligned with said spindle, and a positioning pin removably affixed to said base at a predetermined reference point for selective disposition in said locating holes to accurately locate each said hole over said reference point.

2. In a machine of the class including a base and a spindle mounted for rotation about an axis fixed with respect to said base, the combination comprising a slide guided on said base for movement along a predetermined rectilinear path transversely to said spindle axis, a table mounted on said slide for rotary movement about an axis parallel to that of the spindle, said axes being normally spaced apart generally in the direction of said slide movement, a template fixed on said table for movement therewith, means for successively securing each of a plurality of identical workpieces in the same predetermined position on said template, said template being formed with a plurality of locating indicia disposed radially outwardly of the said position of the workpiece with respect to the table axis, each said indicia being radially aligned with and all being equidistantly spaced from the respective points on said workpiece, which are to be aligned with said spindle, and means for removably securing each said indicia over a predetermined reference point on said base.

3. In a machine tool of the class including a base and and a spindle mounted for rotation about an axis fixed with respect to said base, the combination comprising a slide guided on said base for rectilinear movement transversely to said spindle axis, a template carried by said slide for rectilinear movement therewith and pivotally connected to said slide for angular movement relative thereto about an axis parallel to that of the spindle, means successively securing each of a plurality of identical workpieces in the same predetermined position on said template, said template being formed with a plurality of locating holes radially outwardly of said position of the workpiece with respect to the table axis, each said hole being radially aligned with and all being equidistantly spaced from the respective points on said workpiece which are to be aligned with said spindle, and a positioning pin removably affixed to said base at a predetermined reference point for selective disposition in said locating holes to accurately locate each said hole in registry with said reference point.

4. In a machine tool of the class including a base and a spindle mounted for rotation about an axis fixed with respect to said base, the combination comprising a template having a combined sliding and pivotal connection with said base, said connection defining an axis of angular movement for the template with respect to the base, said axis of angular movement being parallel to the spindle axis, means guiding said connection in a predetermined rectilinear path over the base, said path extending generally in a direction in substantial alignment with said respective axes, means for successively securing identical workpieces in the same predetermined position on said template, said template being formed with a locating indicia radially outwardly of the said predetermined position with respect to the template axis, said indicia being radially aligned with a point on said workpieces which is to be aligned with said spindle, and means for removably securing said indicia over a predetermined reference point on said base.

References Cited in the file of this patent
UNITED STATES PATENTS

| | | |
|---|---|---|
| 1,396,302 | Wagner | Nov. 8, 1921 |
| 2,816,465 | Honnef | Dec. 17, 1957 |
| 2,874,599 | Charlat | Feb. 24, 1959 |
| 3,097,569 | Scandale et al. | July 16, 1963 |